Patented Oct. 8, 1935

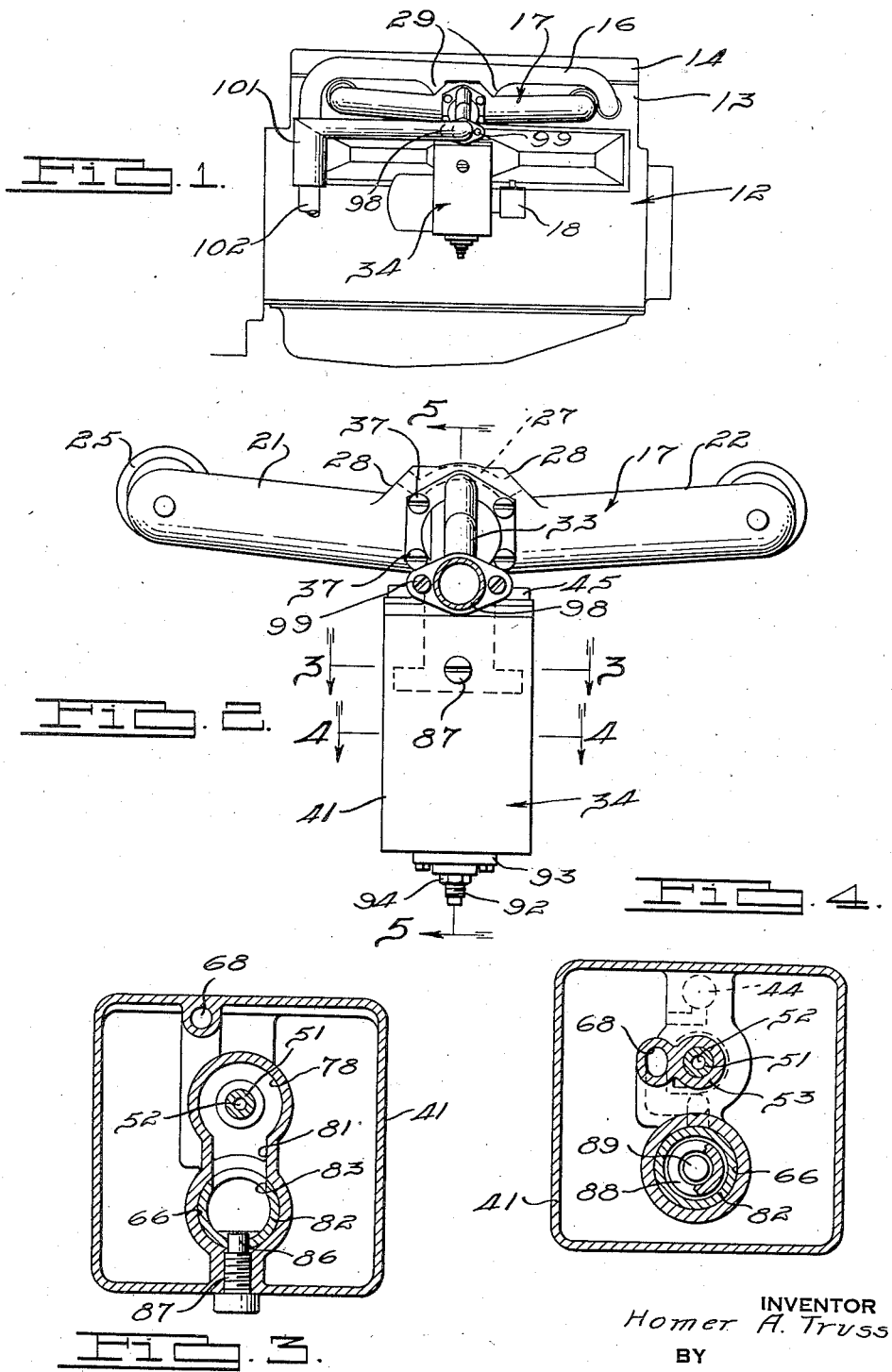

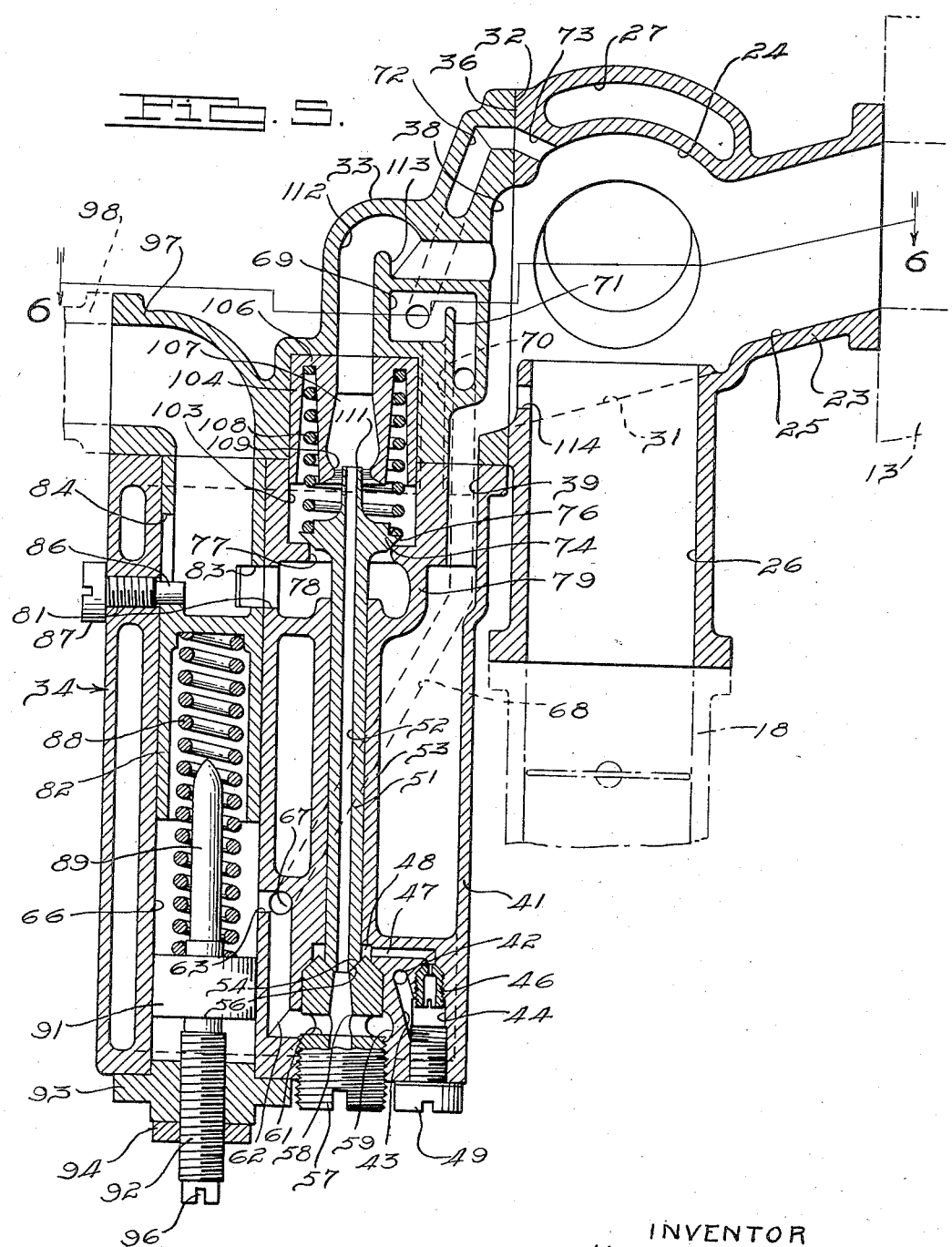

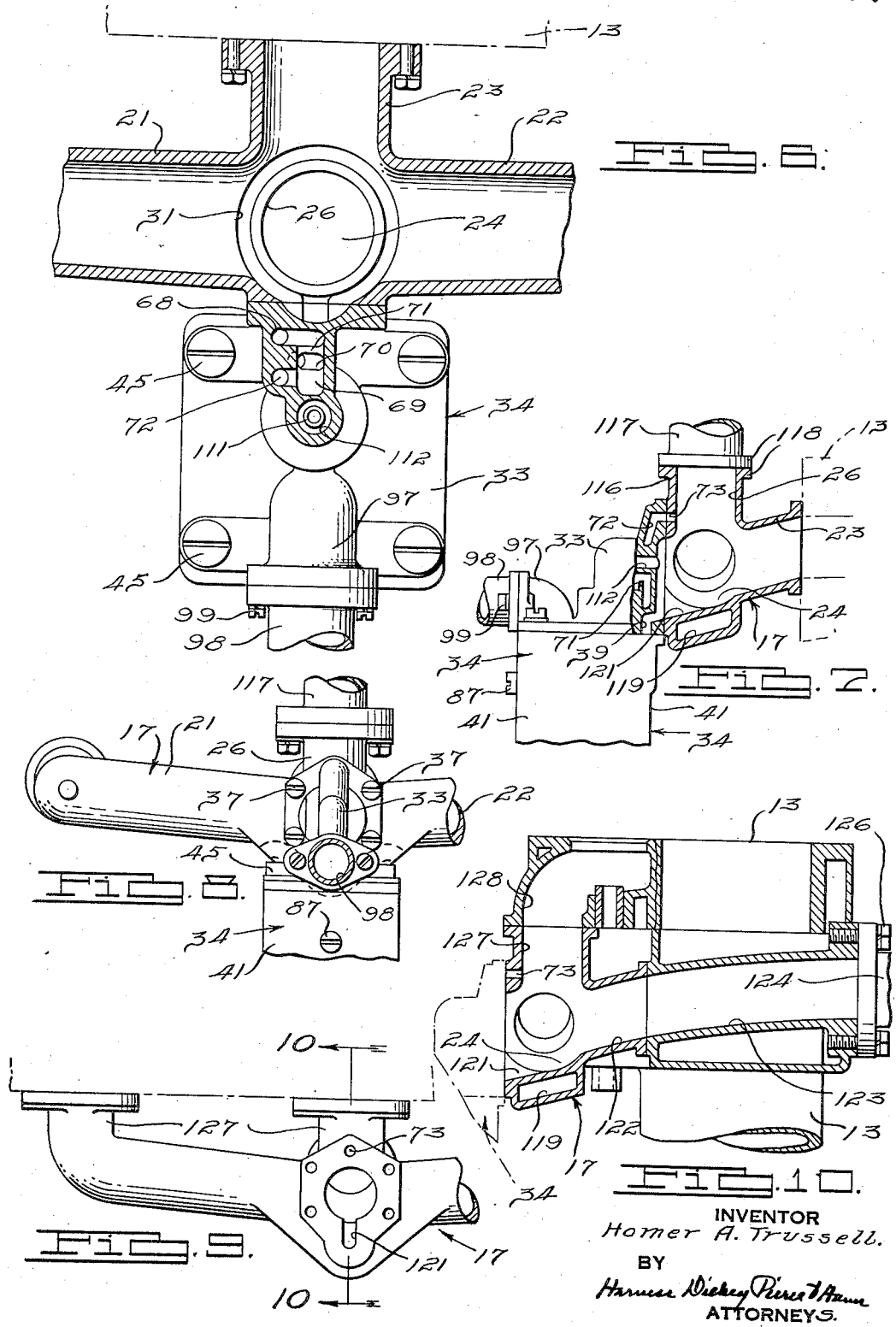

2,016,352

UNITED STATES PATENT OFFICE 2,016,352

FUEL SYSTEM FOR INTERNAL COMBUSTION ENGINES

Homer A. Trussell, Detroit, Mich.

Application December 17, 1931, Serial No. 581,670

16 Claims. (Cl. 123—122)

This invention relates to charge forming devices and has particular relation to apparatus for supplying auxiliary air to be employed in revaporizing and supplying particles of fuel separated from the mixture in charge forming devices under certain conditions of operation thereof.

Some of the principal objects of the invention are: To collect particles of fuel (commonly called heavy ends) which are not properly vaporized during the formation of a fuel charge or which condense out of the fuel charge after vaporization and after reconditioning such fuel particles or heavy ends by the vaporization thereof with auxiliary air to re-introduce said secondary mixture thus formed into the main fuel charge from which the fuel particles were collected; to so collect and dispose of separated fuel particles in charges for internal combustion engines as to permit the use of large main fuel induction passages which offer relatively low resistance to the flow of the mixture therein and consequently make possible the introduction to the engine of a greater fuel charge at maximum engine speed; to automatically introduce auxiliary air to the intake manifold of an engine in the correct proportion for all conditions of operation and to mix with this auxiliary air a proper proportion of fuel which failed to reach the engine in vaporized form due either to low velocity, excessive supply, low operating temperature, or to any other causes; to provide a charge forming device having associated therewith means for receiving liquid fuel particles from the induction passage as rapidly as they accumulate therein and for making them immediately available for properly enriching auxiliary air introduced into the engine charge and without removing such accumulated fuel from the immediate vicinity of the induction manifold; to utilize the difference in pressure between the atmosphere and that of the interior of the induction manifold for vaporizing and returning such accumulated fuel particles to the main fuel charge; to deliberately divide the main fuel charge into vaporized and unvaporized portions and then, after accurately metering the unvaporized portion and mixing it with accurately metered auxiliary air, to properly distribute the auxiliary mixture thus formed throughout the aforesaid vaporized portion of the main fuel charge; to so construct a charge forming device that a relatively large quantity of heat may be applied to the unvaporized portion of the fuel charge without decreasing the fuel economy or the volumetric efficiency of the engine; to provide a charge forming device in which a conventional fuel carbureting and induction system will function normally during the engine starting and idling period and when the engine is pulling hard or running at high speed with a wide open throttle; to provide a charge forming device regulated by engine speed for a given throttle opening, or by the difference of pressure between the main fuel induction passage and the atmosphere, and affected by various operating temperatures to vary the richness of the mixture of the reclaimed fuel and auxiliary air fed to the main fuel charge; to automatically reduce the proportion of auxiliary air or auxiliary air and reclaimed fuel being fed to the engine as the engine speed increases a certain amount for a given main throttle opening without necessitating a change in the main throttle opening; to automatically admit auxiliary air or auxiliary and reclaimed fuel to the engine only during a comparatively small range of pressure differential of the main fuel induction passage and the atmosphere, thus maintaining a more uniform engine operation and taking advantage of the best opportunity to introduce auxiliary air and to reclaim the separated fuel; to gradually vary the reclaimed fuel charge so as not to appreciably vary the performance of the engine during a change from one type of charge to another; to provide a reclaimed fuel and auxiliary air mixing device which delivers a richer mixture during low engine operation temperatures; and, to accomplish these ends with a simple, fully automatic, self contained unitary device operating independently of any connection with the main fuel throttle and readily applicable to all conventional types of fuel induction manifolds, carbureting systems and engines.

One of the principal difficulties encountered in the construction of charge forming devices as heretofore designed has been the separation of liquid fuel from the charge and the collection of such separated fuel in pools or drops upon the walls of the induction manifold during certain conditions of engine operation. When no means is provided for disposing of this fuel it sometimes flows directly into the engine and causes a relatively non-explosive mixture in certain cylinders thereof or flows entirely out of the charge forming device through the carburetor inlet opening and is then unavailable for any useful purpose. This separation of fuel becomes so pronounced under certain circumstances that the speed or performance of the engine is very unfavorably affected, sometimes even to such an extent as to render the engine entirely inoperative.

In order to avoid this unsatisfactory condition of engine operation numerous expedients have been resorted to, for example, such as the admission of auxiliary air at various conditions of engine operation, the application of heat to the main fuel charge and numerous variations in manifold design have been proposed but thus far nothing seems to have been devised as a remedy which did not in some way adversely affect the engine operation.

This invention contemplates the separation of the main fuel charge into vaporized and unvaporized parts, the unvaporized part being stored in a chamber or container adjacent the induction manifold where an auxiliary charge is formed by mixing metered quantities of such unvaporized fuel with metered quantities of auxiliary air and thereafter distributing the auxiliary charge throughout the main charge when conditions of engine operation favor such redistribution.

In the drawings:

Fig. 1 is a side elevational view of an internal combustion engine embracing a charge forming device constructed according to the principles of the invention;

Fig. 2 is a side elevational view on a larger scale of an induction manifold and free-fueling or auxiliary charge forming device employed in the charge forming device disclosed by Fig. 1;

Fig. 3 is a cross-sectional view of the free-fueling device taken substantially on line 3—3 of Fig. 2;

Fig. 4 is also a cross-sectional view of the free-fueling device illustrated by Fig. 2 but taken substantially on line 4—4 thereof;

Fig. 5 is a further enlarged longitudinal sectional view of the free-fueling device and induction manifold disclosed by Fig. 2 and is taken substantially on line 5—5 thereof;

Fig. 6 is a horizontal sectional view through a portion of the induction manifold and the upper portion of the free-fueling device as such elements might appear on line 6—6 of Fig. 5;

Fig. 7 is a view partly in cross-section and partly in elevation of a portion of the free-fueling device as employed with an induction manifold for a downdraft carburetor;

Fig. 8 is a front elevational view of the structure disclosed by Fig. 7;

Fig. 9 is a front elevational view of a form of induction manifold having a horizontal rearwardly extending inlet passage and with the free-fueling device removed therefrom;

Fig. 10 is a vertical sectional view through an engine and the structure disclosed by Fig. 9, with a free-fueling device partially illustrated in dot and dash lines, such view representing the structure as it might appear in the plane of line 10—10 of Fig. 9.

Referring particularly to Fig. 1, an internal combustion engine 12 employed in practicing the invention comprises a cylinder block 13 having a head 14, an exhaust manifold 16, an inlet or induction manifold 17, a liquid fuel carburetor 18 and an auxiliary charge forming or free-fueling device 34.

As illustrated, (see Figs. 1–6) the induction manifold 17 comprises a pair of laterally extending branches 21 and 22 and a rearwardly extending branch 23, all having ends inclined upwardly toward the engine, as indicated at 25, and all of which are connected at one end with a charge distributing chamber 24 arranged at the upper extremity of a manifold inlet or fuel supply passage 26 with which the carburetor 18 is connected.

In order to provide a small resistance to the flow of a large quantity of combustible mixture and thus to permit the engine to run at an unusually high speed, the passages of the inlet manifold 17 are made unusually large in cross-sectional area.

Above the charge distributing chamber 24 the manifold 17 is hollowed out as indicated at 27 to provide a chamber for the circulation of exhaust gas from the manifold 16, or for other suitable heating fluid. The opposite extremities of the heating fluid passage 27 terminate in oppositely inclined portions 28 (see Fig. 2) which portions cooperate with complementary portions 29 of the exhaust manifold 16 through registering openings therein to circulate exhaust gas within the manifold to and from the heating passage 27.

The upper extremity of the manifold inlet passage 26 is surrounded by a forwardly inclined annular groove 31, the lower end of which is intersected by a vertically disposed planular manifold surface 32 which also intersects the forward portion of the charge distributing chamber 24. A supporting portion 33 of an auxiliary charge forming or free-fueling device 34 is provided with a rearwardly disposed planular surface portion 36 which is disposed against the manifold surface 32 and secured thereto by means of screws 37.

The rear surface of the member 33 is provided with a depression 38 which completes the formation of the charge distributing chamber 24 and the inclined annular passage 31.

A duct 39 extending downwardly from the lower extremity of the depression 38 tends to drain any liquid fuel separated from the charge in the charge distributing passage 24 into an auxiliary or reclaimed fuel retaining casing or receptacle 41 which is formed in a lower interior portion of the auxiliary charge forming device 34. The supporting member 33 and the receptacle are secured rigidly together by screws indicated at 45.

The separated fuel particles collected in the auxiliary fuel chamber or reservoir 41 may flow outwardly therefrom through an outlet opening 42, a duct 43 a metering chamber 44, a metering valve 46, a duct 47 and into an annular liquid supplying passage 48. The metering valve 46, which is threaded in a recess portion at the upper extremity of the metering chamber 44, may be removed entirely from the structure and any different size valve substituted therefor merely by removing a screw 49 which is threaded into the lower extremity of the metering chamber 44 for closing the latter.

Within the annular liquid supplying chamber 48 is disposed the lower end of a valve stem 51 having a duct 52 therein and which is slidably mounted for vertical movement within a centrally disposed tubular portion 53 of the casing or receptacle 41. The lower end of the stem 51 is provided with a tapering surface or valve 54 adapted to seat upon an inwardly tapering surface 56 formed in the upper extremity of a mixing valve element 57 which is threaded into an opening in the lower surface of the casing 41. Extending downwardly in the mixing valve element 57, and communicating with the lower end of the duct 52 in the stem 51, is an axially disposed passage 58 the lower extremity of which communicates through radial openings 61 with an annular chamber 59 surrounding an intermediate portion of the element. A side portion of the annular chamber or passage 59 communicates with the lower end of a duct 62, the upper end of which communicates through an opening 63 with a cylindrical air control valve chamber 66.

Through a laterally projecting opening 67 the upper end of the opening 62 also communicates with a duct 68 leading upwardly through one of the side walls of the casing 41, through a portion of the supporting member 33 and into a lower extremity of a chamber 69 formed in the interior of the supporting member. In order to prevent the flow of liquid downwardly through the duct 68, the chamber 69 is provided with a chamber dividing baffle 71 on the opposite side of which the chamber is connected by an upwardly inclined passage 72 formed in the supporting member 33 and by a passage 70 terminating in the upper portion of the receptacle 41. The upper end of this passage in turn communicates with a downwardly inclined passage 73 formed in the manifold 17 and terminating in the upper region of the charge distributing chamber 24.

A short distance below the upper extremity of the valve stem 51 is formed a valve member 74 having thereon a frusto conical seating surface 76 which is adapted normally to close an opening 77. This opening is formed at the upper extremity of an annular air supplying chamber 78 surrounding the portion of the valve stem 51 beneath the valve 74 and formed in an enlarged upper portion 79 of the tubular member 53. An opening 81 at one side of the annular chamber 78 provides a communication between the chamber and an upper region of the cylindrical air valve casing 66 heretofore referred to.

Slidably mounted within the cylindrical opening 66 is a piston valve 82 having a port 83 which communicates with the opening 81 when the valve is in its uppermost position. The side of the valve 82 opposite the port 83 is provided with a slot 84 formed longitudinally therein and the lower end of which is engaged by an end 86 of a screw 87 threaded in an opening formed in the casing 41. The upper extremity of the slot 84 is far enough from the lower end thereof that the former will not be engaged by the pin 86 until the valve 82 has been moved downwardly into a position where the port 83 is entirely below the opening 81.

Tending to maintain the valve 82 in an elevated position is a coil spring 88, the upper end of which engages the valve 82 while the lower end thereof surrounds a guide rod 89 and abuts a cylindrical stop 91 secured thereto. The end of the guide or adjusting rod 89 beyond the stop 91 is threaded as indicated at 92 and is adjustably disposed in a closure member or cap 93 secured to the casing 41 over the lower end of the cylindrical openings 66. A lock nut 94 upon the outer end of the threaded portion of the rod 89 and a slot 96 at the extremity thereof provide means for adjusting the spring 88 to any desired extent.

In order to provide heated air for the auxiliary charge forming device 34 the supporting member 33 is provided with a flanged extension 97 having a passage formed therein communicating with the cylindrical opening 66 and with the interior of a conduit 98 having a flanged end adapted to be secured to the flanged extension 97 by bolts 99. The opposite end of the air conduit 98 communicates with a casing 101 surrounding an exhaust conduit 102 with which the exhaust manifold 16 communicates. The casing 101 is provided with an inlet through which air is admitted and thereafter becomes heated when traveling along the exterior surface of the exhaust conduit 102.

The upper extremity of the opening 77 in which the valve 74 is adapted to seat communicates with a cylindrical opening 103 formed partially in an upper portion of the casing 41 and partially in a lower portion of the supporting member 33. In the upper region of the opening 103 and projecting a short distance downwardly into the portion of the opening located in the casing 41 is rigidly secured a sleeve 104 having an inwardly flanged upper end portion 106 which supports the upper end of a Venturi tube 107 disposed inside the sleeve 104 and concentrically thereto. Between the flanged end 106 of the sleeve 104 and the upper surface of the valve 74 is compressed a coil spring 108 which tends to maintain the valve 74 upon its seat and the lower end of the valve stem 51 against the inwardly tapering surface of the mixing valve member 57. The constricted portion 109 of the venturi 107 is disposed directly opposite to and surrounds an upper end portion 111 of the stem 51 where it terminates above the valve 74. With such construction the greatest degree of pressure reduction within the duct 52 caused by the flow of fluid through the venturi 107 will occur when the upper end of the stem is directly opposite the portion 109 of the venturi 107 and the pressure reduction in the duct will proportionately decrease as the stem is moved upwardly away from such portion.

Whenever the valve 74 is off its seat and there is any liquid fuel in the storage receptacle 41 a fuel and air mixture formed in the venturi 107 is admitted from the discharge end of the latter to the charge distributing chamber 24 through a duct 112 formed therebetween in the supporting member 33.

A baffle 113 arranged in an intermediate portion of the duct 112 prevents liquid fuel which might be condensed in the portion of the duct between the baffle and the charge distributing chamber 24 from flowing downwardly into the venturi 107. It will be observed that the end of the duct 112 terminates in the charge distributing chamber 24 substantially centrally thereof and in such manner that the auxiliary charge will be discharged at right angles to the flow of the main charge from the manifold inlet 26.

In the event liquid fuel is separated from the main charge in such large quantities as to cause the fuel receptacle 41 to be entirely filled, the receptacle eventually will overflow through an opening 114 formed in a portion of the manifold inlet 26 surrounded by the annular recess 31.

In the structure disclosed by Figures 7 and 8 the auxiliary charge forming or free fueling device 34 is substantially the same as that illustrated in Figs. 1 to 6 although the induction manifold 17 is modified slightly by the provision of an upwardly projecting manifold inlet passage 116, rather than a downwardly projecting one, to accommodate a downdraft carburetor of any well known construction. Such down draft carburetor is provided with an outlet passage 117 connected to the passage 116 by cooperating flanges indicated at 118. In such manifold construction the charge distributing chamber 24 preferably is heated by a heating fluid passage 119 arranged beneath the distributing chamber rather than above the latter as is illustrated by Figs. 1 to 6. Liquid fuel separated from the charge in the charge distributing chamber 24 is conducted from the lower extremity of the latter by a groove 121 which is inclined toward the inlet end of the duct 39 leading to the fuel storage reservoir 41.

In the structure disclosed by Figs. 9 and 10 the inlet manifold 17 is provided with a substantially horizontal manifold inlet passageway 122 which communicates with a similarly directed passage 123 formed in the engine block 13 between a pair of adjacent cylinders therein. A horizontal carburetor outlet 124 is connected by bolts 126 in such position as to communicate with the passages 122 and 123 and to supply a combustible charge thereto. Also in this structure upwardly extending outlet passages 127 of the manifold 17 communicate with a plurality of valve chambers 128 formed in a portion of the engine block 13 in which the engine valves are located. Otherwise the manifold 17 as disclosed by Figs. 9 and 10 is substantially the same as that disclosed by Figs. 7 and 8. The free fueling device 34 employed by the manifold disclosed by Figs. 9 and 10 is substantially identical with that disclosed in the preceding figures.

Referring particularly to Figs. 1 to 6 (inasmuch as the operation of the structures disclosed by all of the figures of the drawings is substantially the same) the carburetor 18 forms a combustible mixture of liquid fuel and air which is conducted through the manifold inlet 26, the charge distributing chamber 24 and the manifold branches 21, 22 and 23, to one or more engine cylinders arranged in the block 13. At minimum engine throttle opening or engine idling speed, the difference in pressure between the atmosphere and the interior of the inlet manifold 17 is great enough to move the air control valve 82 against the compression of the spring 86 until the stop 86 engages the upper extremity of the notch 84 and the opening 83, at such valve position, is out of register with the opening 81. Under such circumstances no air can be admitted to the air supplying chamber 78 and consequently the valve 74 does not open against the force of the spring 108.

Inasmuch as the velocity of the charge in the various portions of the inlet manifold 17 is relatively low at engine idling speed by reason of the unusually large size of the manifold, some liquid particles will collect upon the various manifold walls beyond the manifold inlet 26 and such particles will drain downwardly through the inclined annular passage 31 and the passage 39 into the liquid fuel reservoir 41. Such collected fuel, however, will not be admitted to the engine during engine idling speed because no air is admitted to the chamber 78 to lift the valve 74 and the lower end of the stem 51 from their seats. At idling speed then the engine will simply operate upon the charge formed by the carburetor 18 and the fuel separated therefrom will be stored in the receptacle 41.

However, should the engine throttle be thrown entirely open during a throttling period and the engine be permitted to exert its full power either against a load which would maintain it at some predetermined constant speed or all of the power of the engine should be absorbed in increasing its speed until the maximum speed of the engine were attained, the inlet manifold pressure would immediately increase and would remain at such value that the difference in pressure between the atmosphere and the cylindrical chamber 103 would not raise the valve 74 off its seat notwithstanding the fact that the spring 88 would elevate the valve 82 into such position that the ports 81 and 83 would register.

It will be seen that the auxiliary charge forming device 34 will not affect the operation of the engine under the above conditions at either minimum or maximum engine throttle opening.

However, should the engine throttle be opened to a somewhat greater extent than it is open at engine idling speed, for example, to such an extent that the difference between the slightly increased inlet manifold pressure and atmospheric pressure will permit the valve 82 to rise high enough that the upper edge of the port 83 will pass beyond the lower edge of the opening or port 81, then a small amount of air will be admitted from the atmosphere to the air supplying chamber 78 beneath the valve 74. Under such circumstances the fluid pressure in the air supplying chamber 78 will be substantially equal to atmospheric pressure while the inlet manifold pressure above the valve 74 will be considerably lower than atmospheric pressure and the valve 74 will be opened against the compression of the spring 108. The valve, however, will not be open to any great extent because of the fact that only a limited amount of air is being admitted through the partially registering ports 81 and 83 under which circumstance the valve will rise from its seat only a short distance and will practically float in such position upon the air passing therebeneath.

Such flow of air beneath the valve 74 and through the constricted portion 109 of the venturi 107 will create a pressure in the duct 52 lower than the inlet manifold pressure and a small quantity of the mixture within the inlet manifold will flow through the ducts 73 and 72 to the chamber 69, then through ducts 68 and 62 to the mixing valve element 57 and thereafter into the duct 52 where it will be mixed with the air flowing through the venturi 107. In flowing through the mixing valve element 57 the aforesaid small quantity of mixture from the inlet manifold 17 will entrain therein liquid fuel particles from the annular passage 48 which are permitted to flow into the mixing valve when the valve 74 and stem 51 are elevated by the flow of air through the opening 77.

Regardless of the difference in pressure created by the flow of air through the venturi 107 only a predetermined quantity of liquid fuel will be supplied from the annular passage 48 by reason of the metering valve 46 which acts as a restriction to the flow of liquid from the liquid storage receptacle 41. The auxiliary mixture thus formed in the venturi 107 will be conducted to the charge distributing chamber 24 through the duct 112 and will be thoroughly mixed with the main charge in the distributing chamber by reason of its projection therein centrally of the distributing chamber and transversely with respect to the flow of a charge from the manifold inlet 26.

Such supplying of an auxiliary charge independently of the charge formed by the carburetor 18 will not materially increase the total charge delivered to the engine and therefore will not cause the engine to race because whatever charge is supplied to the induction manifold above the engine throttle simply decreases by that amount the quantity of charge supplied through the throttle opening and by the carburetor 18.

As the engine throttle is progressively opened beyond the position just referred to and as the induction manifold pressure is progressively increased as a result of such increase in throttle opening, the slide valve 82 will move progressively upwardly within the cylindrical opening 86. The farther the valve moves in such direction the greater will be the extent of the opening through the ports 81 and 83 and the greater will be the amount of air supplied to the air supplying chamber 78. As the quantity of air in the chamber 78 increases the valve 74 and the mixing valve 57 will be opened to a greater extent to accommodate a greater flow of air through the opening 77 until an extent of opening is reached at which the progressively increasing inlet manifold pressure and the pressure exerted by the spring 108 will be sufficient to hold the valve 74 from opening under the influence of atmospheric pressure in the air supplying chamber 78 to any greater extent.

As the valve 74 is thus progressively opened the ratio between the quantity of air supplied to the venturi 107 and the quantity of fuel supplied through the duct 52 gradually increases by reason of the fact that as the valve 74 opens the end 111 of the stem 51 moves farther beyond the more constricted region 109 of the venturi and consequently supplies to the venturi a lesser quantity of fuel in proportion to the air than would be supplied when the valve occupied any more nearly closed position.

When the valve 74 has finally assumed the aforesaid position in which it will not open to a greater extent regardless of the extent of opening of the ports 81 and 83, any further progressive opening of the engine throttle will gradually cause the valve 74 to move towards its seat. Such tendency of the valve to close under such conditions is caused by the decrease in the difference in pressure between the atmospheric pressure and the induction manifold pressure as the engine throttle valve is thus progressively opened. As the valve 76 thus moves toward its seat under the influence of the increasing pressure in the induction manifold the end 111 of the stem 51 moves nearer the region of greatest constriction in the venturi 107 and the amount of fuel in proportion to the air admitted through the valve 76 increases until the flow of fuel is finally throttled by the approach of the lower end of the valve stem 51 toward the mixing valve 57. When the valve 74 finally closes the flow of air through the venturi 107 and of fuel through the duct 52 are simultaneously discontinued.

After the air and fuel then are finally shut off by the operation of the valve 74 the engine throttle may be still further opened to full open position and the engine will operate during such period on the fuel and air mixture supplied by the carburetor 18.

In the event the auxiliary charge forming device operates with the valve 74 opened for the admission of air to the venturi 107 for such a long period as to exhaust the supply of reclaimed fuel in the fuel receptacle 41 the engine will continue to operate with substantially the same performance with the admission of auxiliary air alone. Under conditions of operation when the throttle is partially open and the load on the engine is relatively small the engine will satisfactorily operate with a relatively lean mixture which the supply of auxiliary air alone provides.

However, should the load be too great for the continued and constant speed operation of the engine with such lean mixture, the inlet manifold pressure will at once increase and reduce the opening of the valve 74; if the load is great enough to slow up the engine sufficiently, this pressure will increase to such an extent as to entirely close the valve 74; and, if the auxiliary air encounters an over-rich mixture in the inlet manifold thereby forming a mixture which causes the engine to tend to race, the inlet manifold pressure drops and lowers the valve 82 on to the point of closing the port 81 if the tendency to race becomes sufficiently pronounced.

All of the adjustments associated with the auxiliary fueling device 34 are made to provide for the proper operation of the engine at some intermediate engine speed and at light running conditions such as would prevail when a motor vehicle is traveling at a moderate speed along a level road. Should the slope of the road change, however, so that the motor vehicle would be running up an inclined surface, and under which circumstances the load on the engine would be slightly increased, the inlet manifold pressure would immediately increase to such an extent as to provide a wider opening of the ports 81 and 83 therethrough would be admitted a greater quantity of auxiliary air. Such admission of air would of course carry with it in passing through the venturi 107 a predetermined and metered quantity of fuel from the reservoir 41 and such added charge would tend to prevent any further decrease in the speed of the engine or a further increase in the inlet manifold pressure. However, if the incline be steep or long enough or if the operator were to open the main carburetor throttle, a reduction in the height of the valve 74 would occur and the free fueling charge would return to normal and subsequently this valve would close completely so that the main carburetor could supply the fuel for the hill climbing load without any fuel reclaiming or auxiliary air economizer action by the free fueling device. When running down hill the load on the engine is of course somewhat decreased and the engine will tend to run faster at a given throttle opening than it would normally run, in which event the resultant decrease in inlet manifold pressure would tend to close the valve 82 and consequently to restrict the amount of air flowing through the ports 81 and 83.

In the event the air supplied to the air valve 82 is in a highly heated state due to the employment of the heating device 101, the volumetric efficiency of the engine is not appreciably affected due to the expansion of the heated air for the reason that such air is admitted to the charge distributing chamber 24 above the engine throttle and only at engine speeds where the volumetric efficiency is not appreciably affected by the expansion of air. However, when the engine is operating at wide open throttle and when it is desirable to conduct through the induction manifold the greatest possible quantity of air, no air is admitted through the valve 76 and consequently the volumetric efficiency of the engine will be whatever it might be without the auxiliary charge forming device 34.

The employment of the device 34 either with or without heated air simply takes advantage of certain operating conditions in the engine, when it is possible to supply auxiliary air and fuel which might otherwise be wasted, to decrease the quantity of fuel supplied by the carburetor under which the engine normally operates.

While, as hereinbefore stated, the induction pressure at idling speed is low enough under normal operating conditions to hold down the valve 82 and thus to prevent the admission of air through the ports 81 and 83 or the opening of the valve 74, it is to be observed that this is true only in the event the engine at idling speed does not stall or tend to stall. In a cold engine, for example, it sometimes happens that an engine will stall at idling speed due to an excessively lean mixture caused by the condensation of fuel on the walls of the induction manifold. Should an engine, equipped with a free fueling device such as that herein disclosed, tend to stall, it is inherent in the operation of an engine under such conditions that immediately upon tending to stall there will be an appreciable increase in induction manifold pressure which will then be not sufficiently great to prevent the upward movement of the valve 82 and the resulting admission of an auxiliary charge through the passage 112.

Should the engine tend to stall at idling speed when hot, due to the flooding of the engine when the speed is quickly reduced by the application of brakes, the induction manifold pressure will again increase slightly, as it does with a cold engine, and as a result thereof, either air or air and reclaimed fuel will then be admitted through the duct 112. Such admission of an auxiliary charge will prevent the engine from stalling even though reclaimed fuel is admitted with such charge because the opening of the ports 81 and 83 has the same effect upon the engine as an increase in throttle opening would have. In either event a greater charge would be supplied to the engine but not an over rich one.

As a summary of the operation of the engine and of the conditions under which it will be affected by the free fueling device 34 it may be said that auxiliary air is admitted when the engine is running lightly or slightly faster than normal for a given moderate throttle opening; is being propelled by the inertia of a vehicle; with a free wheeling installation in use, when the engine is running lightly, just between the points of pulling normally and running free at idling speed; when running slower than car speed but faster than idling speed. This latter condition exists with free wheeling when the operator neglects to close the throttle to idling position while the engine is running slower than car speed.

Auxiliary air is shut off when the engine is idling with minimum throttle opening; when the engine is pulling normally with a properly balanced main fuel charge; when pulling with the throttle wide open; when full torque is being developed; when maximum power is being developed; and when maximum speed is being developed.

Fuel from the reclaimed fuel tank flows back into the induction manifold only when auxiliary air is being taken into the induction manifold and the amount of auxiliary air admitted, regardless of whether it is carbureted with reclaimed fuel, is just enough to provide for maximum engine speed for a given throttle opening. The volume of auxiliary air or if reclaimed fuel is available the volume of auxiliary air and reclaimed fuel is reduced and may be entirely shut off in the event the engine tends to race.

The amount of auxiliary air admitted is greater if reclaimed fuel is available, and the maximum degree of richness of the mixture of these two is just right for average engine operation. Reclaimed fuel is metered and fed to the engine in such manner that an increase in the volume of auxiliary fuel admitted immediately tends to lean out the main fuel charges and as the engine speed increases with a given throttle opening during the introduction of auxiliary air and reclaimed fuel, this mixture becomes progressively greater in volume and leaner, the leanest mixture occurring with the delivery of the greatest volume of auxiliary fuel charge concurrent with the maximum pulling speed of the engine for a given throttle opening. The mixture of the auxiliary fuel charge becomes progressively richer and less in volume if either of the following conditions occurs while the greatest volume of auxiliary fuel charge is being fed to the intake manifold: the engine tends to race; the engine speed is decreased by increased load; the main throttle opening is increased to a heavier pulling point; the main throttle is reduced or closed to idling position; or the engine coasts back down toward the speed corresponding to a smaller throttle opening. This mixture finally returns to normal and is shut off if either of these conditions occurs to a sufficient degree. These conditions are better met by having the auxiliary fuel charge normally rich while it is being shut off, particularly during operating conditions which result in reclaimed fuel being present in the free fueling tank 41.

The maximum richness of the mixture supplied by the free fueling device is just right for average operating conditions and occurs when the suction is just strong enough to lift valve 76 and to draw fuel and air through the duct 112. Any increase in suction lifts the valve 76 farther from its seat to admit more air through the opening 83 but the amount of reclaimed fuel fed with such air does not increase because it is metered by gravity through the metering valve 46 and because the venturi 107 operates less efficiently to draw fuel through the duct 52 under such conditions.

The valve 76 will float under conditions which will cause it to open and at a point which will keep the main fuel charge just lean enough to provide maximum engine speed for a given throttle opening. If reclaimed fuel is available under such conditions the valve 76 will float somewhat higher to provide the portion of air charged with fuel which is passed through it to the main charge and which consequently causes to increase the suction in the engine manifold by helping to drive the engine somewhat faster. Under such conditions it may be necessary for the operator to slightly close the main throttle to prevent a slight increase in vehicle speed.

Inasmuch as liquid fuel is admitted at the bottom of the valve stem 52 and air at the valve 74 adjacent the top of such valve stem the contraction and expansion of the valve stem due to variations in temperature conditions will slightly vary the ratio of fuel and air admitted in the form of an auxiliary charge. For example, when the valve operating temperature is relatively low the stem 52 will contract to a slight extent and will permit the admission of a greater quantity of fuel beneath the lower end thereof than would occur under warmer operating conditions.

The operation of the free fueling device does not abruptly affect the operation of the engine because the quantity of the auxiliary charge gradually increases from nothing to a maximum or decreases from a maximum to no auxiliary charge as the speed and the demands of the engine change.

Throughout the range of operations of the auxiliary charge forming device the engine has a noticeably lively feeling at light loads as though it were eager to run ahead of the throttle and at heavy load when the auxiliary charge forming device is not operative the engine has more power by reason of the employment of an unusually large induction manifold which the auxiliary charge forming device makes possible.

When starting the engine with the choke of the carburetor closed the auxiliary charge forming device is not operative because the high suction created by the turning over of the engine moves the air controlling valve 82 in its closed position.

While for the purpose of illustration only a plurality of forms of the invention have been disclosed herein in detail, it will be apparent to those skilled in the art not to be so limited but that various other forms and applications of invention may be made within the scope of the invention as set forth by the appended claims.

I claim:

1. An internal combustion engine comprising a charge forming device having an induction passage, a reservoir for collecting and storing a material volume of fuel particles separated from the charge in said induction passage during engine operation and automatic means including passages and valves between said passage and reservoir for returning said fuel particles from said reservoir to the engine between, but not at, maximum and minimum limits of engine operating speed.

2. An internal combustion engine comprising a charge forming device having an induction passage therein, a reservoir for collecting liquid fuel separated from the main fuel charge in said induction passage, means for supplying said liquid fuel to the engine at a progressively decreasing rate as the engine speed increases and until a predetermined engine speed is attained and then for supplying said fuel to the engine at an increasing rate as the engine speed increases until a predetermined engine speed is attained.

3. An internal combustion engine comprising a charge forming device having an induction passage and means for supplying auxiliary air to said passage at a progressively increasing rate until a predetermined engine speed has been reached and thereafter for supplying auxiliary air to said induction passage at a progressively decreasing rate, means for carbureting said auxiliary air with fuel reclaimed from the working fluid during operating conditions necessitating over-rich mixture, and means for withholding said reclaimed fuel from said induction passage until said auxiliary air is supplied.

4. An internal combustion engine comprising a charge forming device having an induction passage, a duct for admitting auxiliary air to said induction passage, and a valve for controlling said duct, said valve being operable from closed position to open said duct to a maximum at a predetermined intermediate engine speed and thereafter to close said passage progresively as said engine speed approaches its maximum limit, and means governed by operating temperatures to admit more of said auxiliary air during higher operating temperatures than at lower temperatures.

5. In a fuel system for an internal combustion engine, means for separating the combustible fluid into vaporized and unvaporized portions, means for adding auxiliary air to said combustible fluid and means controlled by the suction in the main fuel induction passage for withholding said unvaporized portion and said auxiliary air from the main fuel charge when the main fuel throttle is in its minimum and its maximum positions.

6. In a carbureting system for an internal combustion engine, means adapted to meter reclaimed fuel and auxiliary air and deliver them to the main fuel charge during moderate suction in the main fuel induction passage and means situated between the atmosphere and said first mentioned means to render said first mentioned means inoperative during high suction in said passage.

7. In combination with the fuel induction system of an internal combustion engine, means for reclaiming fuel within the area having the main fuel induction pressure, said means including means for introducing auxiliary air and means for metering of the reclaimed fuel to obtain predetermined ratios of reclaimed fuel to auxiliary air which are delivered to the engine with the main fuel charge, and means for withholding at said induction pressure for subsequent delivery such amounts of said reclaimed fuel which may be reclaimed faster than it is metered for delivery.

8. In combination with the fuel induction system for an internal combustion engine, means for removing unvaporized fuel from the fuel charge, means for adding auxiliary air to the fuel charge and for vaporizing said unvaporized fuel and delivering it to the fuel induction system, and automatic means for shutting off the delivery of reclaimed fuel and auxiliary air during engine operation while the main fuel throttle is in minimum and maximum positions and at any other position of the engine throttle when the engine tends to race.

9. In combination with an internal combustion engine having a main induction passage, means for trapping liquid fuel particles therein, a reservoir for receiving said particles, a duct connected with said induction passage, a pair of passages for air and fuel respectively connecting the atmosphere and said reservoir respectively with said duct, a valve element to control the flow of said air and fuel through said pair of passages, said valve element having an air valve at one end and a fuel valve at the other end, said valves arranged to permit simultaneous increase of flow in both of said pair of passages upon movement of said element in one direction.

10. In a device of the class described, a fuel induction system, means for removing unvaporized fuel particles therefrom and returning said particles with auxiliary air thereto, said means including means for feeding said particles so that their rate of flow is substantially constant while being delivered back to said system, and means for supplying said auxiliary air in metered quantities to obtain predetermined fuel-air ratios.

11. In a device of the class described, a fuel induction system for an internal combustion engine, throttling means for said system, means for removing unvaporized fuel particles from said system and returning them to said system with auxiliary air, the last mentioned means including automatic means for reducing the proportion of auxiliary air and removed fuel particles being fed to the engine as the engine speed increases a given amount for a given opening of said throttling means.

12. In a device of the class described, an intake manifold for an internal combustion engine, a device for receiving unvaporized fuel particles from said manifold and for mixing said particles with auxiliary air and redelivering them to said manifold, said device including means for controlling the time and amount of such redelivery and proportions of auxiliary air to said particles, said device forming a unitary structure applicable to and removable from said manifold as such.

13. In a carbureting system for an internal combustion engine, the combination with a fuel induction passage, means including a liquid trap associated with said passage for removing unvaporized fuel from the combustible fluid in said passage, a reservoir associated with said trap for storing said unvaporized fuel, and means for returning said removed fuel from said reservoir with auxiliary air to said passage concurrently with a predetermined reduction of the suction in said passage from maximum operating value including ducts connecting said induction passage with said reservoir and with the atmosphere together with pressure operated valves controlling said ducts, the mixture of said returned fuel and auxiliary air upon said predetermined reduction being relatively rich, the volume of said mixture becoming greater and its richness less upon a further reduction of suction, then less in volume and in richness upon a still further reduction of suction, and then of greater richness as the volume is reduced to zero concurrently with a reduction in said suction toward minimum operating value.

14. In combination with an internal combustion engine fuel induction system, means for removing unvaporized fuel from said system including a liquid trap associated with a main induction passage thereof, a reservoir for said removed fuel, and means including co-operating valves and passages for returning said removed fuel from said reservoir and auxiliary air to said system and for regulating the mixture of said returned fuel and auxiliary air, said valves being automatically operated by pressure differential between said induction passage and the atmosphere and being so regulated that said mixture starts relatively rich and, as the engine speed increases for a given throttle opening, becomes progressively greater in volume and leaner, then less in volume and still leaner, and then relatively rich and its volume is reduced to zero.

15. In a fuel system for an internal combustion engine, the combination of means for supplying working fluid through an induction conduit to the combustion chamber thereof, means for reclaiming liquid fuel particles from the working fluid in said conduit during engine operation, means for delivering said reclaimed fuel and auxiliary air at predetermined rates and ratios to said working fluid, said last mentioned means including a valve for controlling the flow of reclaimed fuel and auxiliary air, said valve being affected by temperature changes therein to feed a greater amount of auxiliary air during the higher operating temperatures, and means for withholding for subsequent delivery said liquid fuel particles which may be reclaimed faster than needed to maintain said predetermined delivery.

16. In combination with the induction system of an internal combustion engine, means for collecting and retaining unvaporized fuel particles therein during engine operation, means for admitting auxiliary air to said system, and means for feeding said fuel particles under the influence of gravity from said retaining means into a zone of influence of said auxiliary air means whereby to be mixed with said auxiliary air and delivered to said system, the feeding capacity of said third mentioned means being limited below the collecting capacity of the first mentioned means and said first mentioned means temporarily retaining a resultant surplus of said unvaporized fuel particles out of the path of the working fluid in ingress to the engine.

HOMER A. TRUSSELL.